United States Patent [19]

Nonaka et al.

[11] Patent Number: 4,948,884
[45] Date of Patent: Aug. 14, 1990

[54] PROCESS FOR THE HALOGENATION OF COPPER PHTHALOCYANINE

[75] Inventors: Yoshiyuki Nonaka; Junichi Tsuchida; Masami Shirao; Toshiro Notoji; Michichika Hikosaka, all of Tokyo, Japan

[73] Assignee: Toyo Ink Manufacturing Co., Ltd., Tokyo, Japan

[21] Appl. No.: 353,330

[22] Filed: May 16, 1989

[51] Int. Cl.$^5$ .................... C07D 487/22; C09B 47/04
[52] U.S. Cl. .................... 540/138; 540/136; 540/137
[58] Field of Search .................... 540/136, 137, 138

[56] References Cited

U.S. PATENT DOCUMENTS 3,231,583  1/1966  Frey .................... 260/314.5

FOREIGN PATENT DOCUMENTS 2707849   9/1977  Fed. Rep. of Germany .
52-29819  3/1977  Japan .
279975   10/1989  Japan .
1496256  12/1977  United Kingdom .

OTHER PUBLICATIONS

Kleist et al., Chemical Abstracts, vol. 86 (1977), 173078k.

Primary Examiner—Richard L. Raymond
Attorney, Agent, or Firm—Wenderoth, Lind & Ponack

[57] ABSTRACT

Provided according to this invention is a process for the halogenation of copper phthalocyanine in titanium tetrachloride in the presence of aluminum chloride, which comprises preliminarily stirring both a part or all of the aluminum chloride and the copper phthalocyanine in titanium tetrachloride at not less than 50° C. and carrying out the halogenation reaction, provided that when the part of the aluminum chloride is added for the preliminary stirring, the remaining portion of the aluminum chloride is added during the halogenation reaction.

4 Claims, No Drawings

PROCESS FOR THE HALOGENATION OF COPPER PHTHALOCYANINE

FIELD OF THE INVENTION

This invention relates to a process for the halogenation of copper phthalocyanine which is widely used as a green pigment. More specifically, it relates to a process for the smooth halogenatation of copper phthalocyanine in titanium tetrachloride.

PRIOR ART OF THE INVENTION

The conventional industrial process for the halogenation of copper phthalocyanine is generally carried out by dissolving copper phthalocyanine in a melt of aluminum chloride-sodium chloride or in chlorosulfonic acid. The disadvantages of these processes are that the recovery of the solvent is difficult and that the wastewater treatment is consequently posed as a problem, and these disadvantages make production cost high.

On the other hand, nitrobenzene, trichlrobenzene, titanium tetrachloride, etc., are inert to halogen and are recoverable. However, copper phthalocyanine is insoluble in these solvents. In attempts to dissolve copper phthalocyanine in these solvents, a solid-gas phase reaction takes place, in which the halogenation comes to a stop on the surfaces of the particles, i.e., the halogenation does not sufficiently proceed. Therefore, the above attempts have not yet been put to practical use.

In these attempts using titanium tetrachloride as a solvent, there are known processes which are intended to allow the halogenation reaction to proceed sufficiently, such as a process for chlorination under a pressure of not less than 2 atmospheres as is disclosed in U.S. Pat. No. 3,231,583, a process for chlorination in a solvent of titanium tetrachloride containing aluminum chloride as is disclosed in Japanese Laid-Open Patent Publication No. 29819/1977, and the like. However, the process of U.S. Pat. No. 3,231,583 has a defect that the requirement of a pressure of not less than 2 atmospheres is not desirable in view of plant design and in the reaction of copper phathalocyanine in a solvent of titanium tetrachloride containing aluminum chloride, disclosed in Japanese Laid-Open Patent Publication No. 29819/1977, the disadvantage is that its reaction system is likely to become nonuniform and form a large mass composed of a mixture of aluminum chloride and copper phthalocyanine to make it impossible to proceed with the reaction. In the process of Japanese Laid-Open Patent Publication No. 29819/1977, oxyhalide of sulfur is incorporated in order to achieve a uniform reaction system. However, its effect is not satisfactory.

SUMMARY OF THE INVENTION

The obJect of this invention is to provide a process for halogenation of copper phthalocyanine by using, titanium tetrachloride containing aluminum chloride, in which the reaction system exhibits fine dispersion and the halogenation of copper phthalocyanine is sufficiently carried out.

This invention provides a process for the halogenation of copper phthalocyanine in titanium tetrachloride in the presence of aluminum chloride, which comprises preliminarily stirring both a part or whole portion of the aluminum chloride and the copper phthalocyanine at not less than 50° C. and carrying out the halogenation reaction, provided that when part of the aluminum chloride is added for the preliminary stirring, the remaining portion of the aluminum chloride is added during the halogenation reaction.

DETAILED DESCRIPTION OF THE INVENTION

The present inventors have diligently studied in order to overcome the defect, i.e., difficulty in maintaining the reaction system stably, in the conventional process for halogenation of copper phthalocyanine using, titanium tetrachloride containing aluminum chloride, and consequently found it possible to maintain the fine dispersion reaction system and achieve the sufficient halogenation by carrying out the preliminary stirring, before initiating the halogenation reaction, to form an adduct of copper phthalocyanine with aluminum chloride or a salt thereof.

In this invention, the "copper phthalocyanine" generally stands for nonhalogenated copper phthalocyanine. However, partially halogenated copper phthalocyanine may be used.

In this invention, the weight of titanium tetrachloride for use is 4 to 20 times as large as the weight of copper phthalocyanine, preferably 5 to 20 times and more preferably 8 to 12 times. If the weight of titanium tetrachloride is less than the above 4 times, it is difficult to stir a slurry, and if said weight exceeds 20 times, it is economically disadvantageous.

In order to proceed with the halogenation reaction and obtain highly halogenated phthalocyanine having not less than 12 halogen atoms, the amount of aluminum chloride necessary for use, by mole, is not less than 3 times as large as the amount of phthalocyanine. Therefore, the total amount of aluminum chloride, by mole, is not less than 3 times, preferably 3 to 8 times and more preferably 4 to 5 times.

The method of adding aluminum chloride is important to maintain the stable reaction system. That is, the important point is to preliminarily stir phthalocyanine and aluminum chloride to form an adduct of phthalocyanine with aluminum chloride or a salt thereof before carrying out the halogenation reaction. With regard to the amount of aluminum chloride to be added for the preliminary stirring (to be referred to as "initial addition amount" hereinbelow), the whole portion of aluminum chloride may be added or part may be added. When its part is added for the preliminary stirring, its remaining portion is all added little by little by separating said portion further to smaller portions while the halogenation reaction proceeds. In case of adding the remaining portion little by little, aluminum chloride in an amount 0.4 to 4 times, by mole, as large as that of phthalocyanine is added for the preliminary stirring, and the remaining portion of aluminum chloride is added during the halogenation reaction until its addition amount in total reaches 3 to 8 times by mole.

The relationship between the addition amount of aluminum chloride and the stability of the reaction system is also influenced by the amount of titanium tetrachloride. Namely, when the amount of titanium tetrachloride is large relative to copper phthalocyanine, aluminum chloride in a necessary amount may be added at one time. However, when the amount of titanium tetrachloride is small, it is preferable, in order to maintain the reaction system stably, to arrange that the initial addition amount of aluminum chloride should be small and that the remaining portion of aluminum chloride should be also added little by little during the halogenation reaction. As for the time for adding the remaining portion of aluminum chloride, it is preferable to add the same when the halogenation reaction becomes moderate.

The temperature for the preliminary stirring to form an adduct of aluminum chloride with copper phthalocyanine or a salt thereof is not less than 50° C., preferably from 80 to 137° C. (titanium tetrachloride has a boiling point of 136.4° C.).

The period of time for the preliminary stirring to form the salt differs depending upon the initial addition amount of aluminum chloride, the amount of titanium tetrachloride and temperature. When the initial addition amount of aluminum chloride is small relative to the amounts of copper phthalocyanine and titanium tetrachloride, the adequate period of time is 0.5 to 2 hours at 100 to 120° C.. When the initial addition amount of aluminun chloride is large, it is necessary to carry out the preliminary stirring for at least 2 hours, preferably 2 to 10 hours, more preferably 2 to 30 hours.

Examples of the halogenating agent include chlorine gas, sulfuryl chloride, bromine, and the like.

The temperature for the halogenation reaction is preferably from 100 to 137° C., and the reaction temperature may be further elevated by pressurizing in order to accelerate the reaction rate.

In order to recover halogenated copper phthalocyanine after the reaction, there is a method which comprises filtering the slurry or which comprises first recovering titanium tetrachloride by distillation, treating the remaining magma with hydrochloric acid, sulfuric acid, acetone, methanol, etc., and then filtering.

On the basis of the following observation of experiments, the present inventors have estimated the mechanism in which the reaction system consisting of titanium tetrachloride, aluminum chloride and copper phthalocyanine is rendered unstable.

1. If aluminum chloride alone is stirred, under heat, in titanium tetrachloride, the aluminum chloride particles are not dissolved completely. However, when a system further containing copper phthalocyanine is prepared and stirred under heat, the aluminum chloride particles disappear. The copper phthalocyanine particles are floating before the preliminary stirring since they are lighter than titanium tetrachloride. After the stirring, the system formed a suspension state. The microscopic observation of the particles of the suspension showed that the rectangular-shaped copper phthalocyanine changed to round thick particles. That is, it is thought that, by the preliminary stirring, aluminum chloride diffuses among the copper phthalocyanine particles to form their adduct or salt.

2. If the halogenation reaction is carried out without the preliminary stirring, the diffusion of aluminum chloride is insufficient and unstability is therefore caused on the reaction system, in which the suspension containing aluminum chloride and copper phthalocyanine aggregates to form a large mass.

3. The reaction product adheres to the wall of a flask in the initial stage of the halogenation reaction, and as the reaction proceeds, it falls off the wall. That is, it is thought that since the product in the initial stage of halogenation of phthalocyanine has adhesive property, the mass is likely to be formed.

In view of the above observations, it is thought that the mass formation in the initial stage of the reaction when no preliminary stirring is carried out is caused by the fact that low halogenated coper phthalocyanine having adhesive property adheres to aluminum chloride as a core before the formation of the adduct or salt and grows. Therefore, in order to stabilize the reaction system, it is necessary to accomplish the formation of an adduct of aluminum chloride with copper phthalocyanine or their salt by carring out the preliminary stirring before the start of the halogenation reaction so that the aluminum chloride particles do not work as the core.

The following Examples and Comparative Examples will explain the process for the halogenation of copper phthalocyanine in this invention. In the Examples and Comparative Examples, "part" and "%" stand for "part by weight" and "% by weight", respectively.

In addition, in the Examples and Comparative Examples hereinbelow, the numbers of substituted chlorine atoms were determined as follows.

The halogen contents were determined by comparing samples with the standard sample of which the halogen content was measured by combusition flask method, by the use of fluorescent X ray.

EXAMPLE 1

Titanium tetrachloride (800 parts), 40 parts of crude copper phthalocyanine and 37.2 parts of aluminum chloride (4 times by mole as large as the amount of phthalocyanine) were charged into a reactor. The temperature of the reactor was raised to 110 to 115° C. with stirring over about 30 minutes and this temperature was maintained for 3 hours with continuous stirring. Thereafter, the temperature was elevated to 135°–137° C. and a chlorine gas was introduced at a rate of 5 parts/hour for 25 hours, and titanium tetrachloride was distilled off. The distillation residue (magma) was treated with hydrochloric acid, and heated to 70–80° C. with stirring to form a slurry. The slurry was filtered, washed with water and dried to give 72.3 parts of greencolored chlorinated copper phthalocyanine. The measurement of its chlorine content showed that the number of substituted chlorine atoms per copper phthalocyanine molecule was 14.6.

COMPARATIVE EXAMPLE 1

Titanium tetrachloride, crude copper phthalocyanine and aluminum chloride were charged into a reactor such that the proportions of these components were equal to those of Example 1, and heated to 130°–137° C. over 30 minutes while the mixture was stirred. Immediately thereafter, a chlorine gas was introduced at a rate of 5 parts/hour. As a result, a mixture of copper phthalocyanine and aluminum chloride formed a mass and the stirring could not be carried out 30 minutes after the introduction.

EXAMPLE 2

Titanium tetrachloride (600 parts), 40 parts of crude copper phthalocyanine and 16 parts of aluminum chloride were charged into a reactor and heated with stirring. When the temperature reached 120°–125° C., the preliminary stirring of the mixture was carried out over 2 hours at the same temperature. While the above temperature was maintained, a chlorine gas was introduced at a rate of 5 parts/hour, and 8 parts of aluminum chloride was added three times every 4 hours. Further, a chlorine gas was introduced for 16 hours, and the concerned procedure for distillation, etc., was repeated in the same way as in Example 1 to give a green-colored chlorinated copper phthalocyanine. The measurement of its chlorine content showed that the number of substituted chlorine atoms per copper phthalocyanine molecule was 15.0.

COMPARATIVE EXAMPLE 2

Titanium tetrachloride, crude copper phthalocyanine and aluminum chloride were charged into a reactor such that the proportions of these components were equal to those of Example 2, and the mixture was heated to 120°–125° C. with stirring, and immediately thereafter, a chlorine gas was introduced at a rate of 5 parts/hour and aluminum chloride was added three times every 4 hours in the same way as in Example 2. Further, chlorine was introduced for 20 hours until it was recognized that a by-product, hydrogen chloride, did not occur. The color of the resultant copper phthalocyanine was blue. The measurement of its chlorine content showed that the number of substituted chlorine atoms per copper phthalocyanine molecule was only 8.6.

EXAMPLE 3

Titanium tetrachloride (400 parts), 40 parts of crude copper phthalocyanine and 28 parts of aluminum chloride were charged to a reactor, and heated with stirring. When the temperature reached 110°–115° C., the preliminary stirring of the mixture was carried out for 5 hours. Then, the temperature was raised to 135°–137° C. and a chlorine gas was introduced at a rate of 5 parts/hour for 5 hours. And then 10 parts of aluminum chloride was added, and chlorine was further introduced for 20 hours. The concerned procedure for distillation, etc., was repeated in the same way as in Example 1 to give green-colored chlorinated copper phthalocyanine. The measurement of its chlorine content showed that the number of substituted chlorine atoms per copper phthalocyanine molecule was 14.2.

EXAMPLE 4

Titanium tetrachloride (280 parts), 40 parts of crude copper phthalocyanine and 30 parts of aluminum chloride were charged to a reactor and heated with stirring. When the temperature reached 110°–115° C., the preliminary stirring of the mixture was carried out for 8 hours. Then, the temperature was raised to 135°–137° C. and a chlorine gas was introduced at a rate of 4 parts/hour for 5 hours. And then 10 parts of aluminum chloride was added, and chlorine was further introduced for 18 hours. The concerned procedure for distillation, etc., was repeated in the same way as in Example 1 to give green-colored chlorinated copper phthalocyanine. The measurement of its chlorine content showed that the number of substituted chlorine atoms per copper phthalocyanine molecule was 15.4.

EXAMPLE 5

Titanium tetrachloride (480 parts), 40 parts of crude copper phthalocyanine and 25 parts of aluminum chloride were charged to a reactor and heated with stirring. When the temperature reached 85°–90°C., the preliminary stirring of the mixture was carried out for 4 hours. Then, the temperature was raised to 135°–137° C. and a chlorine gas was introduced at a rate of 5 parts/hour for 8 hours. And then 10 parts of aluminum chloride was added, and a chlorine gas was further introduced for 18 hours. The concerned procedure for distillation, etc., was repeated in the same way as in Example 1 to give green-colored chlorinated copper phthalocyanine. The measurement of its chlorine content showed that the number of substituted chlorine atoms per copper phthalocyanine molecule was 13.7.

EXAMPLE 6

Titanium tetrachloride (300 parts), 20 parts of crude copper phthalocyanine and 15 parts of aluminum chloride were charged to a reactor and heated with stirring. When the temperature reached 135°–137° C., the preliminary stirring of the mixture was carried out for 5 hours. Then, while maintaining the above temperature, a bromine gas was introduced at a rate of 1 part/hour for 45 hours, and then 5 parts of aluminum chloride was added, a bromine gas was further introduced for 45 hours and thereafter, the mixture was stirred for 110 hours. The concerned procedure for distillation, etc., was repeated in the same way as in Example 1 to give green-colored brominated phthalocyanine. The measurement of its bromine content showed that the number of substituted bromine atoms per copper phthalocyanine molecule was 12.7.

We claim:

1. A process for the halogenation of copper phthalocyanine in titanium tetrachloride in the presence of aluminum chloride, which comprises preliminarily stirring part or all of the aluminum chloride and the copper phthalocyanine in titanium tetrachloride at a temperature of not less than 50° C. and subsequently carrying out the halogenation reaction, provided that when only a part of the aluminum chloride is added for the preliminary stirring, the remaining portion of the aluminum chloride is added during the halogenation reaction, the amount of titanium tetrachloride being 4 to 20 times, by weight, as large as the amount of copper phthalocyanine, and wherein the amount of aluminum chloride for use in the preliminary stirring is 0.4 to 4 times, by mole, as large as the amount of copper phthalocyanine and the remaining portion of aluminum chloride is added during the halogenation reaction until the total amount of aluminum chloride for use in the preliminary stirring and halogenation reaction is 3 to 8 times, by mole, as large as the amount of phthalocyanine.

2. A process for the halogenation of copper phathalocyanine according to claim 1 wherein the temperature for the preliminary stirring is between 80° C. and 137° C.

3. A process for the halogenation of copper phthalocyanine according to claim 1 wherein the period of time for the preliminary stirring is not less than 2 hours.

4. A process for the halogenation of copper phthalocyanine according to claim 3 wherein the period of time for the preliminary stirring is 2 to 30 hours.

* * * * *